United States Patent [19]

Landau

[11] Patent Number: 5,828,817
[45] Date of Patent: Oct. 27, 1998

[54] NEURAL NETWORK RECOGNIZER FOR PDLS

[75] Inventor: Richard B. Landau, Nashua, N.H.

[73] Assignee: Digital Equipment Corporation, Maynard, Mass.

[21] Appl. No.: 496,510

[22] Filed: Jun. 29, 1995

[51] Int. Cl.[6] .................................................. G06F 15/00
[52] U.S. Cl. ........................................ 395/112; 395/114
[58] Field of Search ................................... 395/112, 114, 395/500, 21, 20, 23, 101, 115, 116, 117, 113; 706/15, 14, 25, 16; 382/155, 156

[56] References Cited

U.S. PATENT DOCUMENTS

| | | | |
|---|---|---|---|
| 4,972,187 | 11/1990 | Wecker | 341/95 |
| 4,992,957 | 2/1991 | Aoyama et al. | 395/112 |
| 5,075,874 | 12/1991 | Steeves et al. | 395/112 |
| 5,165,014 | 11/1992 | Vassar | 395/112 |
| 5,222,200 | 6/1993 | Callister et al. | 395/112 |
| 5,276,771 | 1/1994 | Manukian et al. | 395/24 |
| 5,293,466 | 3/1994 | Bringmann | 395/114 |
| 5,392,419 | 2/1995 | Walton | 395/500 |
| 5,469,373 | 11/1995 | Kashiwazaki et al. | 395/112 |

*Primary Examiner*—Edward L. Coles
*Assistant Examiner*—Dov Popovici
*Attorney, Agent, or Firm*—Krishnendu Gupta

[57] ABSTRACT

Apparatus and method for recognizing the language type of the page description language (PDL) of a print document that is not dependent on the presence of a 'dead-ringer', standard identifying sequence of characters for language type identification.

13 Claims, 4 Drawing Sheets ns,817

NEURAL NETWORK RECOGNIZER FOR PDLS

FIELD OF THE INVENTION

The invention relates generally to the field of computer printers that can print documents encoded in different types of page description language (PDL), and more particularly, to a method and apparatus for recognizing the language type of the page description language (PDL) of a print document using a neural network.

BACKGROUND OF THE INVENTION

Computer printers are used to print documents received from computers. A document is represented as stream of computer characters in a file. Print documents usually contain data for printing, as well as printer instructions in the form of page description language (PDL). A page description language (PDL) is used to instruct or control a computer printer in its printing of the data or information in a print document. Examples of such PDLS are Postscript, HP PCL, etc.

A printer typically has a controller that decodes the print instructions encoded in a PDL in order to process a print document. The controller in turn invokes an interpreter for processing the PDL instructions. As interpreter is a program that processes PDL instructions to instruct or direct the print engine of a printer to place marks on the medium on which a document is to be printed. Each type of PDL has its associated interpreter.

Application software programs running on computer systems generate print documents containing instructions in a specific PDL. Different application software programs are likely to use different PDLs in their print documents. Sometimes a print document may contain multiple data segments, each having its associated print instructions encoded in a different PDL. Therefore, in order for a printer to properly execute a print document it has to be able to correctly identify each PDL associated with a particular print document. Further, if a printer can interpret more than one PDL, the printer must be able switch to the appropriate interpreter in order to print a document correctly.

Additionally, a print document must be sent to a printer that can interpret the PDL or PDLs in which the document is encoded in order for the printer to be able to print it. For example, in a data processing system comprising multiple printers on a network, a print server connected to the network may have to interpret the PDL or PDLS in which a document is encoded in order for it to select a printer to which the document is to be sent for printing.

In order for a print controller to switch to the appropriate interpreter, or for a print server to select an appropriate printer, the controller or the server must first recognize the language type of the PDL or PDLs in which the print instructions are encoded. There are three known schemes that are used to recognize PDLs associated with a print document.

A first scheme involves explicitly stating the PDL type at the start of the print document, e.g., HP PJL has the ability to do so. However, not all PDLs have the ability to do so and hence this scheme only works if a document incorporates PDLs that can explicitly state the PDL type at the start of the print document.

A second scheme that is used to recognize PDLs involves the use of stylized sequences or "dead-ringer" identifying sequences of characters to identify the PDL. These command sequences or identifying sequences of characters are included with each print document to assist in identifying the PDL used and the interpreter to switch to. For example, "%!PS-Adobe" is a 'dead-ringer' identifying sequence of characters contained in a well formed PostScript document. This identifying sequence of characters enables a printer controller to distinguish print documents containing such a sequence as being a PostScript file, having printer instructions encoded in PostScript PDL and therefore ensures that the appropriate PDL interpreter is selected for the print operation.

However, there are many old, non-standard application software programs out in the user community that generate print documents containing non-standard identifying sequence of characters. Also, hand-crafted files do not contain standard sequence of characters identifying the PDL incorporated in the files. Hence, printer controllers and print servers have trouble processing these print documents as they are unable to identify the language type of the PDL to which the non-standard identifying sequence of characters point to.

A third scheme that is used to recognize PDLs involves the examination of statistical characteristics of a print document to predict the language type of the PDL or PDLs associated with the print document. One such prior-art method and apparatus is disclosed by Michael W. Bringmann in U.S. Pat. No. 5,293,466. Bringmann discloses sampling a portion of each print document, and using a resident algorithm and data sets obtained by statistical techniques, to analyze the sampled portion of the print document to identify the PDL in which the print document is encoded.

However, the accuracy with which methods such as the one taught by Bringmann is able identify the language type of the PDL in a print document, needs to be improved.

Hence there is a need for a method and apparatus that accurately recognizes the language type of the PDL or PDLs of a print document, that is neither dependent on the presence of a 'dead-ringer' identifying sequence of characters, nor dependent on the presence of an explicit identifying instruction for language type recognition.

Further, there is also a need for a language type recognition system and method that can be efficiently incorporated in print controller and/or a print server without burdening the host computer with additional processing overhead to correctly print documents.

SUMMARY OF THE INVENTION

An object of this invention is to provide an apparatus and method for recognizing the language type of the page description language (PDL) of a print document that is not dependent on the presence of a 'dead-ringer', standard identifying sequence of characters for language type identification.

Another object of this invention is to allow a printer to process print documents by identifying the PDL or PDLs in which a print document is encoded and thereby ensure that an appropriate PDL interpreter is selected for the print operation.

Yet another object of this invention is enable a print server select one of many printers on a computer network by identifying the PDL or PDLs in which a print document is encoded, and based on the identification selecting a printer on the network having the appropriate PDL interpreter or interpreters for printing the document.

In one aspect, these and other objects of this invention are attained by a language type recognizer. The language type recognizer has a tabulator for tabulating frequency of occurrence of characters in a file; a means for scaling the frequency of occurrence of characters in the file; and a neural network for accepting as input the scaled frequency of occurrence of characters to identify the language type of the file.

In another aspect, these and other objects of this invention are attained by a data processing system comprising a host processor, and a printer incorporating a language type recognizer, where the language type recognizer has a tabulator for tabulating frequency of occurrence of characters in a file; a means for scaling the frequency of occurrence of characters in the file; and a neural network for accepting as input the scaled frequency of occurrence of characters to identify the language type of the file.

An advantage of this invention is a print system that can automatically identify the PDL type of print instructions in a print document, and in the case of a document having multiple PDLS, a print system that can automatically identify all PDLs.

Another advantage of this invention is a print system and language type recognizer that can identify the language type of the PDL in a print document, with a high degree of accuracy.

Yet another advantage of this invention is a print system and language type recognizer wherein the amount of computation required to classify a document by PDL type is within a reasonable range for processing inside either the printer or a print server, without having to burden the host computer with additional processing overhead.

Another advantage of this invention is a networked print system and language type recognizer wherein a print server can accurately identify the PDL or PDLs in which a print document is encoded, and based on the identification select an appropriate printer on the network having the appropriate PDL interpreter or interpreters for correctly printing the document.

The foregoing and additional objects, features and advantages of the present invention will become apparent to those skilled in the art from a more detailed consideration of the preferred embodiment thereof, taken in conjunction with the accompanying drawings.

DETAILED DESCRIPTION OF THE PREFERRED EMBODIMENT

Figure 1:
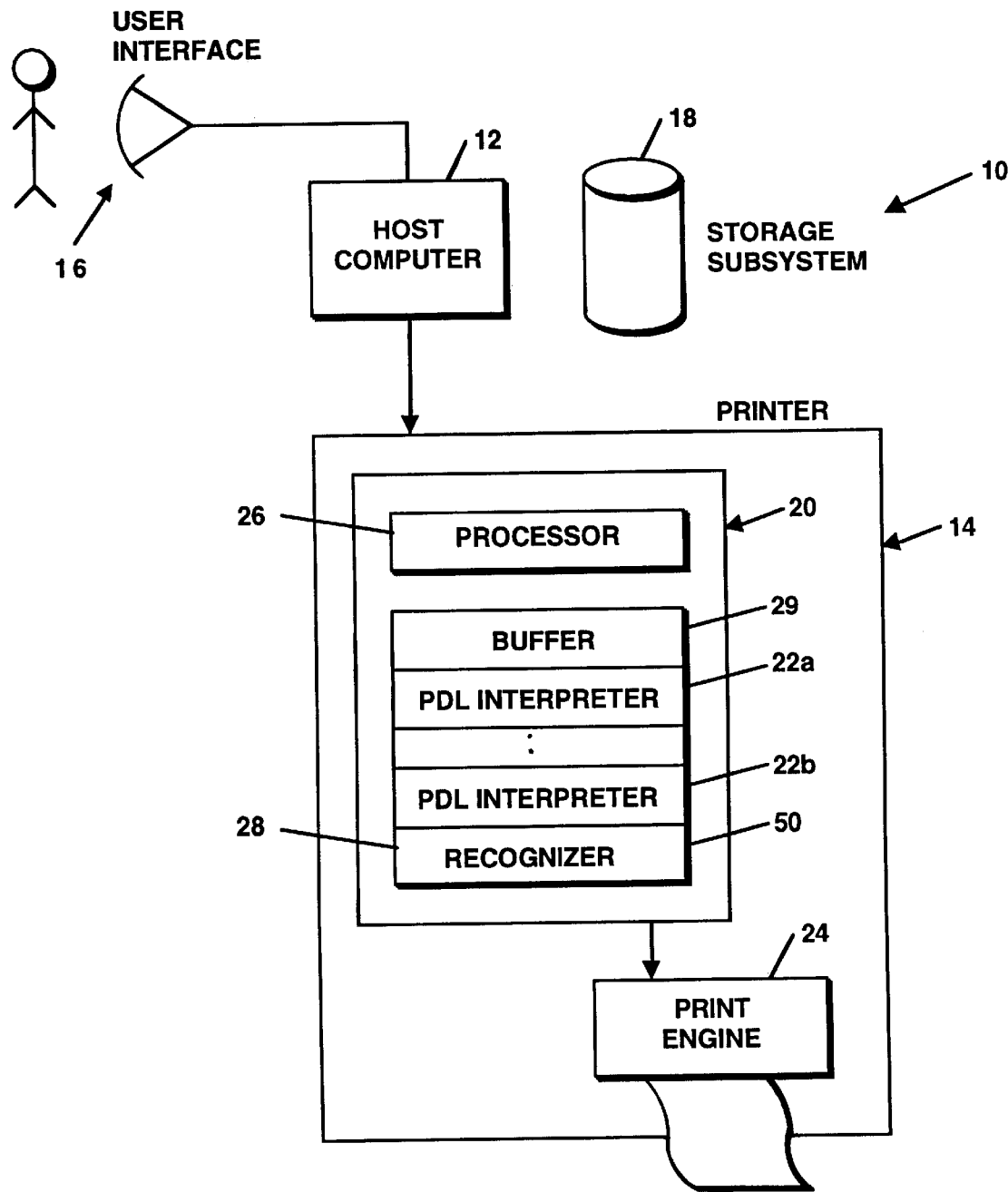
FIG. 1 is schematic drawing illustrating the organization of a data processing system incorporating a printer and a language type identifier, in accordance with the principles of the invention.

Referring to FIG. 1, there is shown schematically a data processing system 10 embodying the principles of the invention. The data processing system 10 may be considered to comprise a host computer 12, a printer 14, a user interface 16 and a storage subsystem 18. As shown in FIG. 1, the printer 14 may be considered to comprise a printer controller 20 and a print engine 24. The print engine 24 marks the medium being used with the printer to generate a hard copy of a print document submitted to the printer.

As seen in FIG. 1, the printer controller 20 includes one or more digital processors 26, and memory 28. Controller memory 28 is used for storing, among other things, controller software such as PDL interpreters 22a and 22b. In the embodiment seen in FIG. 1, for the purpose of illustration, printer 14 has been shown to include two PDL interpreters 22a and 22b. However, printer 14 could conceivably include more than two PDL interpreters.

According to the principles of this invention, as shown in FIG. 1, memory 28 in printer controller 20 also comprises a language type recognizer 50 to identify the PDL or PDLS in which a print document is encoded. The memory 28 in print controller 20 also includes a buffer 29 so that an initial portion of each print document, for example the first 2048 bytes, can be stored for the language type recognizer 50 to process, for a determination of the PDL or PDLs in which the print document is encoded.

Figure 3:
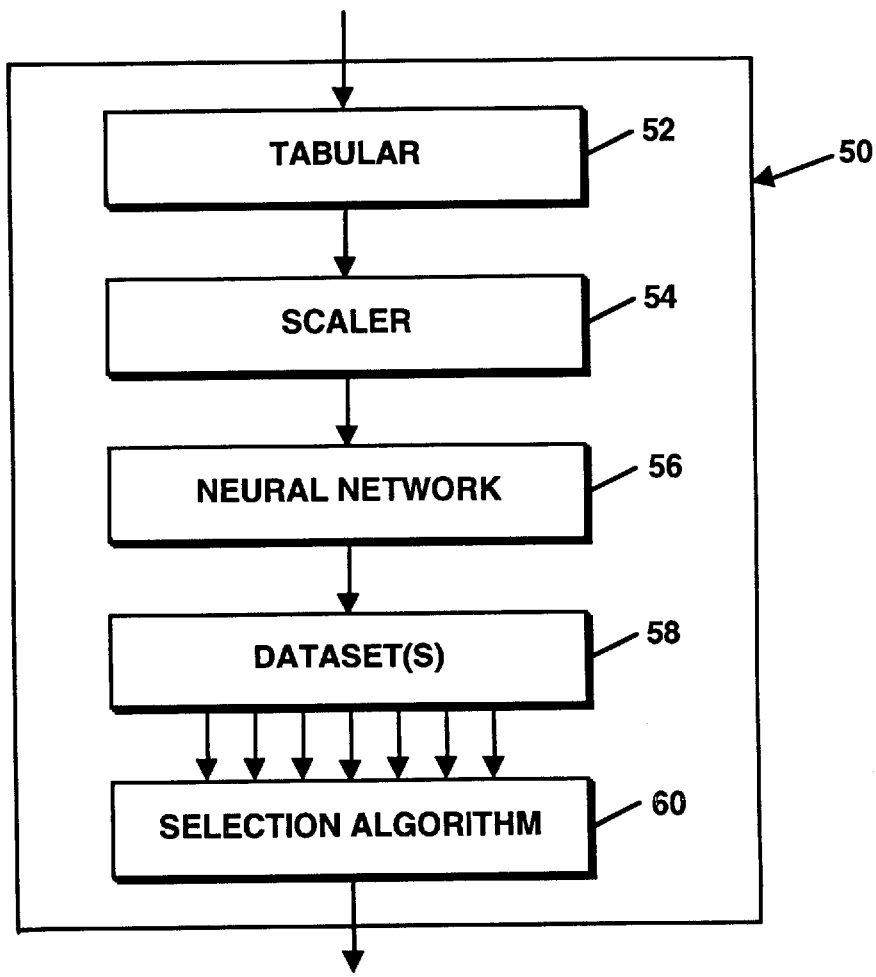
FIG. 3 is a schematic drawing of the language type identifier of FIGS. 1 and 2.

Referring specifically to FIG. 3, the language type recognizer 50 is shown in detail. As seen in FIG. 3, the language type recognizer 50 comprises a tabulator 52. The tabulator 52 is an algorithm stored in controller memory 28. The tabulator 52 tabulates the frequency of occurrence of characters in the initial portion of each print document, for example the first 2048 bytes. Therefore, the input to the tabulator 52 are the initial set of characters in a print document, stored in buffer 29, for example, the first 2048 bytes of the print document. The output from the tabulator 52 is a table of characters encountered by the tabulator 52 and their associated frequencies of occurrence in the initial portion of the print document.

As seen in FIG. 3, the language type recognizer 50 also includes a scaler 54. The scaler 54 is an algorithm stored in the controller memory 28. The scaler 54 accepts as input the output from the tabulator 52. The scaler 54 scales the frequencies of occurrence of characters, in the initial portion of the print document, that it receives from the tabulator 52. The output from the scaler 54 is a table of characters encountered by the tabulator 52 in the initial portion of each print document and their associated scaled frequencies of occurrence.

Figure 4:
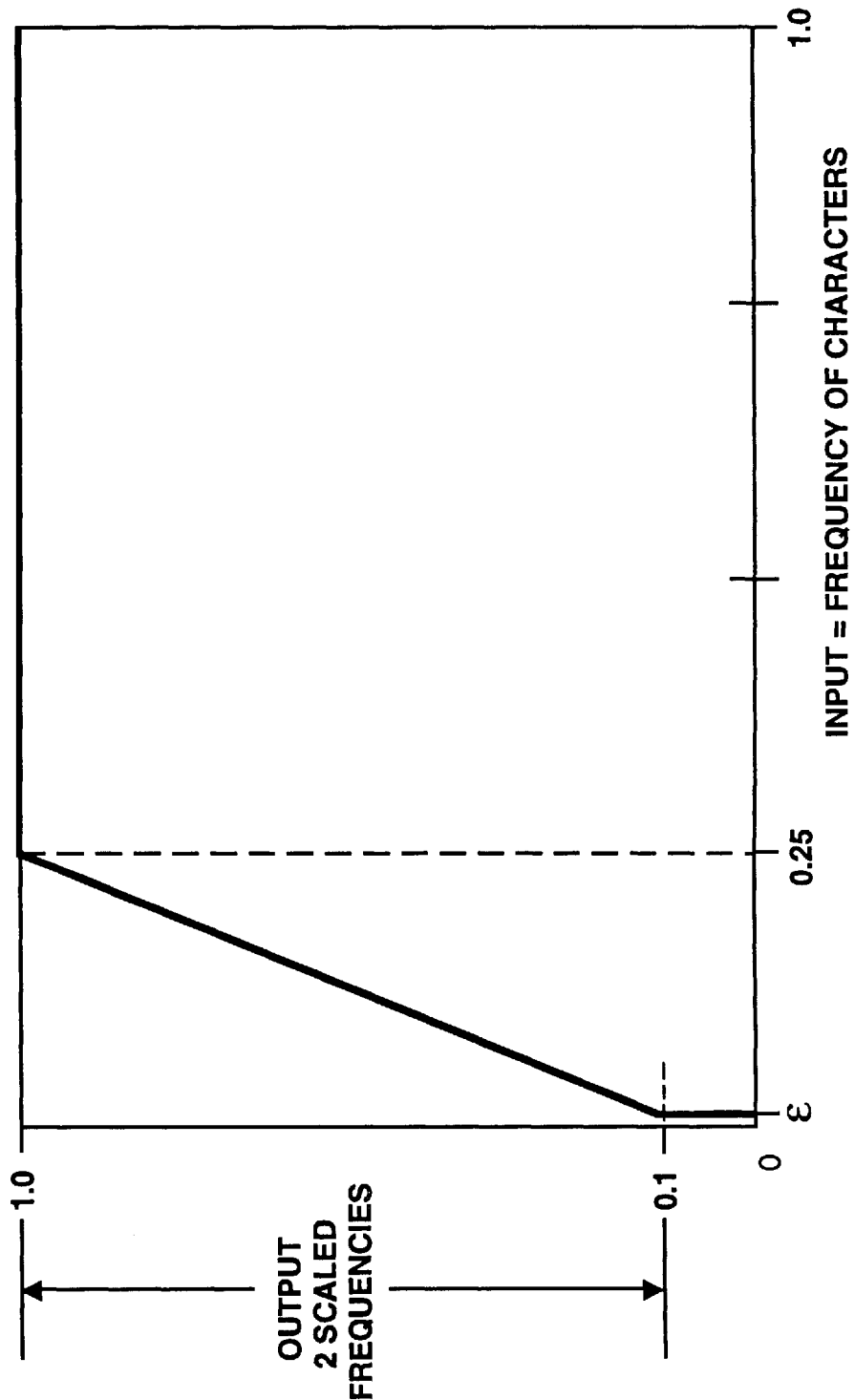
FIG. 4 is graphical representation of the scaling performed by the scaler of the language type identifier of FIG. 3, in accordance with the principles of the invention.

FIG. 4 is graphical representation of the scaling performed by the scaler of the language type identifier 50 of FIG. 3, in accordance with the principles of the invention. As shown in FIG. 4, the horizontal axis represents the input to the scaler 54, while the vertical axis represents the output of the scaler 54.

Referring to FIG. 4, it can be seen that the scaler 54 uses a discontinuous or piecewise scaling function to scale the input frequencies received from the tabulator 52. The discontinuous or piecewise scaling function, as seen in FIG. 4, separates small non-zero values from true zeros. Therefore, a zero count in the set of frequencies received by the scaler 54 is scaled to 0.00, as seen in FIG. 4.

Further, as seen in FIG. 4, the scaler 54 clips input frequencies that are greater than a certain pre-determined threshold to 1.00. Good results were obtained by using 25% (or 0.25) as the threshold frequency and by clipping all frequencies greater than 0.25 to 1.00. However, the threshold frequency for clipping by the scaler could also be set to any value within the range of 20% (or 0.20) to 25% (or 0.25).

Also, as shown in FIG. 4, the scaler 54 scales all input frequencies that are greater than $\in$ and less than the clipping threshold frequency 0.25 to a scaled range of 0.10 to 1.00. Therefore, an input frequency of ∈ is scaled by the scaler 54 to 0.10, while an input frequency of 0.25, the clipping threshold frequency, is scaled by the scaler 54 to 1.00. Good results were obtained by selecting a scaling range of 0.10 to 1.00 as the range of scaled frequencies at the output of the scaler 54. However, other scaling ranges are also conceivable for the practice of the invention.

As seen in FIG. 4, ∈ is the smallest non-zero input frequency value possible given the size of the portion of the print document being analyzed by the tabulator 52. For example, if the tabulator 52 samples the first 1000 characters, then ∈ would be equal to $\frac{1}{1000}$ or 0.001.

Referring now to FIG. 3, it can be seen that the language type recognizer 50 also includes a neural network 56. The neural network 56 is an algorithm stored in the controller memory 28. The details of the neural network 56 is not a part of this invention. The neural network 56 is of the type disclosed by David E. Rumelhart, James L. McClelland and the PDP Research Group in "Parallel Distributed Processing", 1986 by the Massachusetts Institute of Technology pp. 319–355.

According to the principles of the invention, the neural network 56 is first trained off-line, prior to on-line application in the printer 14. Off-line training allows neural network 56 to develop datasets that are characteristic of each PDL type. For off-line training of the neural network 56, print documents encoded in the various PDLs generated by diverse applications are gathered. A large number of sample print documents of each one of the diverse applications is desirable for statistical accuracy.

During off-line training of the neural network 56, each print document is processed through a tabulator, of the type described above, and a scaler, also of the type described above, to create a table of characters encountered by the tabulator in the initial portion of each print document and their associated scaled frequencies of occurrence. This table of characters and their associated scaled frequencies of occurrence is provided as input to the neural network 56 while the PDL type data of the print document is provided at it's output. Using the input and output data provided to it the neural network 56 creates a dataset that is characteristic of the PDL type of the print document by assigning weights to the scaled frequencies of each character according to how much the value of that scaled frequency helps to classify the PDL type correctly.

During off-line training this process is repeated for each print document of a given PDL type to enable the neural network 56 to further enhance it's learning of the characteristics of that PDL type and thereby arrive at a dataset that is an accurate representation of the characteristics of that PDL. Also, the above described off-line training process is repeated across diverse PDL types to enable the neural network to create datasets representative of each PDL type that it is likely to encounter during on-line application.

As shown in FIG. 3, the controller memory 28 includes datasets 58 developed by the neural network 56 during off-line training.

During on-line application, according to the principles of the invention, the neural network 56 analyzes the scaled frequencies received from the scaler 54, and in conjunction with datasets 58 identifies the PDL type of the print document being processed for printing by the printer 14.

Also, as shown in FIG. 3, the controller memory 28 includes selection algorithms 60. Based on the PDL type identified by the neural network 56, selection algorithms 60 selects an appropriate PDL interpreter or interpreters 22*a*, 22*b* for correctly printing the print document.

The printer incorporating a language type recognizer herein described is but one of the many possible advantageous data processing system arrangements which can be conceivably obtained through application of the broad principle of the present invention which provides for language type identification, using the scaled frequency of occurrence of characters in a print document or file, in a data processing system to correctly print a document.

Furthermore, the printer 14 having a language type recognizer 50 as presented in FIG. 1 is intended as only one example of the application of the present invention. Many arrangements falling within this data processing application of the broad principle are conceivable.

Figure 2:
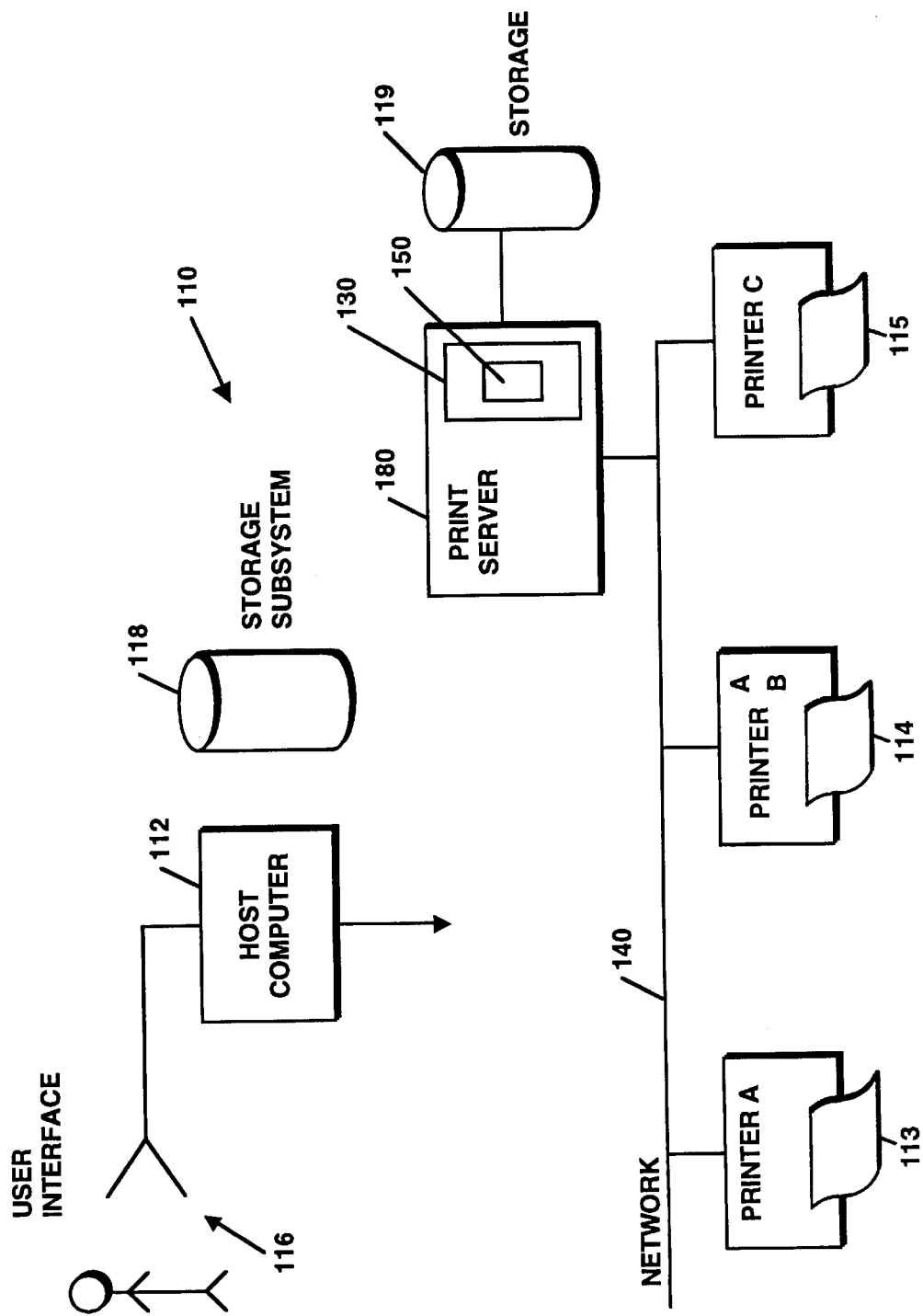
FIG. 2 is a schematic drawing illustrating the organization of a data processing system incorporating a network of printers, and a print server that incorporates a language type identifier, in accordance with the principles of the invention.

For instance, referring to FIG. 2, there is shown schematically a data processing system 110 which shows another application of the present invention. As shown in FIG. 2, data processing system 110 may be considered to comprise a host computer 112 and its associated storage subsystem 118, an user interface 116, and printers 113, 114, 115. As shown in FIG. 2, the printers 113–115 are connected to each other and to the host computer 112 by a computer network 140. Also as seen in FIG. 2, a print server 180 and it's associated storage subsystem 119 are also connected to network 140. Print server 180, among other things, controls the selection of printers 113–115 for processing a print document generated by the host computer 112.

As shown in FIG. 2, each printer is capable of handling different types of PDLs. For example, printer 113 is shown as being equipped with an interpreter for PDL type 'A', printer 114 is shown as being equipped with interpreters for PDL types 'A' and 'B', and printer 115 is shown as being equipped with an interpreter for PDL type 'C'. In the data processing system of FIG. 2, when a print document is generated by the host computer 112 for printing, an appropriate one of several networked printers 113–115 is selected by the print server 180 to create a hard copy of the print document.

According to the principles of this invention, as shown in FIG. 2, memory 130 in print server 180 includes a language type recognizer 150. The language type identifier 150, as described above and as shown in FIG. 3, identifies the PDL or PDLs in which a print document is encoded. Based upon the identification performed by the PDL identifier 150, the selection algorithms of the identifier 150 (not shown in FIG. 2) allows the print server 180 to select an appropriate printer on the network 140 having the appropriate PDL interpreter or interpreters for correctly printing a document.

Further, if a print document contains multiple segments each having print instructions encoded in a different PDL, the print server 180 selects an appropriate printer on the network 140 having each of the required PDL interpreters for correctly printing the document.

For example, if a print document containing segments encoded in PDL types 'A' and 'B' has to be printed in the data processing system 110 of FIG. 2, the print server 180 selects printer 114, which is shown to include interpreters for PDL types 'A' and 'B', to print the document. Further, printer 114 also includes a language type recognizer (not shown) which allows the print controller to interpret the each set of PDL encoded instructions.

It is conceivable that in yet another application of the present invention, a data processing system such as the one shown in FIG. 2 could include printers and print servers each comprising a language type identifier. In such a system, the language type identifier resident in the print server would allow one of several networked printers to be selected, while the language type identifier resident in each printer would allow an appropriate one of several PDL interpreters to be selected for the printer to correctly process a print document.

It is apparent that modifications and different arrangements may be made other than as herein disclosed, without departing from the spirit and scope of the invention. The present disclosure is merely illustrative, the invention comprehending all variations thereof.

I claim:

1. In a printer for receiving a print document for printing, the print document including print instructions in a page description language (PDL), the printer including a recognizer of page description language type comprising:

a tabulator for tabulating frequency of occurrence of characters in the print document;

a scaler for scaling the frequency of occurrence of characters in the print document, wherein the scaler scales a tabulated frequency of zero to a scaled frequency of 0.00, scales all tabulated frequencies greater than a pre-determined threshold to a scaled frequency of 1.00, and linearly scales all tabulated frequencies greater than a zero but less than the pre-determined threshold to scaled frequencies in the range 0.10 and 1.00; and a neural network for accepting as input the scaled frequency of occurrence of characters to identify the language type of the PDL included in the print document.

2. The recognizer of the page description language type of claim 1 wherein the tabulator tabulates frequency of occurrence of characters in an initial portion of the print document.

3. The recognizer of the page description language type of claim 1 wherein the pre-determined threshold is 0.25.

4. The recognizer of the page description language type of claim 1 wherein the neural network is trained off-line using scaled frequencies of occurrence of characters to develop a dataset characteristic of the language type of the PDL included in the print document.

5. A method for recognizing language type comprising:

tabulating frequency of occurrence of characters in a file;

scaling the frequency of occurrence of characters in said file, wherein the step of scaling the frequency of occurrence of characters in said file further comprises scaling a tabulated frequency of zero to a scaled frequency of 0.00, scaling all tabulated frequencies greater than a pre-determined threshold to a scaled frequency of 1.00, and linearly scaling all tabulated frequencies greater than a zero but less than the pre-determined threshold to scaled frequencies in the range 0.10 and 1.00;

training a neural network to assign weights to the frequencies of occurrence of characters, the assigned weights being effective to enable the neural network to classify language type; and feeding as input to the trained neural network the scaled frequency of occurrence of characters of a file to identify the language type of the file.

6. The method of claim 5 wherein the step of tabulating frequency of occurrence of characters in the file further comprises tabulating frequency of occurrence of characters in an initial portion of the file.

7. The method of claim 5 wherein the pre-determined threshold is 0.25.

8. The method of claim 5 wherein the step of training the neural network is performed off-line using scaled frequencies of occurrence of characters to develop a data set characteristic of the language type included in the file.

9. A language type recognizer comprising:

a tabulator that tabulates frequency of occurrence of characters in a file, the file containing characters of a language;

a scaler that scales the frequency of occurrence of characters in the file, wherein the scaler scales a tabulated frequency of zero to a scaled frequency of 0.00, scales all tabulated frequencies greater than a pre-determined threshold to a scaled frequency of 1.00, and linearly scales all tabulated frequencies greater than a zero but less than the pre-determined threshold to scaled frequencies in the range 0.10 and 1.00; and a neural network that accepts as input the scaled frequency of occurrence of characters to identify the language type of the characters in the file.

10. The language type recognizer of claim 9 wherein the tabulator tabulates frequency of occurrence of characters in an initial portion of the file.

11. The language type recognizer of claim 9 wherein the pre-determined threshold is 0.25.

12. The language type recognizer of claim 9 wherein the neural network is trained off-line using scaled frequencies of occurrence of characters to develop a data set characteristic of the language type of the characters contained in the file.

13. The language type recognizer of claim 9 wherein the language is a natural language.

* * * * *